(12) United States Patent
Bailey

(10) Patent No.: US 8,439,449 B1
(45) Date of Patent: May 14, 2013

(54) EZ DUMP LAWN VACUUM

(75) Inventor: Robert Bailey, Lebanon, MO (US)

(73) Assignee: Robert E Bailey, Lebanon, MO (US)

( * ) Notice: Subject to any disclaimer, the term of this patent is extended or adjusted under 35 U.S.C. 154(b) by 0 days.

(21) Appl. No.: 13/432,258

(22) Filed: Mar. 28, 2012

(51) Int. Cl.
*B60P 1/16* (2006.01)

(52) U.S. Cl.
USPC ............................................. 298/17 T

(58) Field of Classification Search ...... 298/175.5–17.7, 298/18, 1 A, 1 B, 1 R, 11, 17 T
See application file for complete search history.

(56) References Cited

U.S. PATENT DOCUMENTS

| | | | | |
|---|---|---|---|---|
| 1,985,373 A | * | 12/1934 | Johnston | 414/486 |
| 2,440,770 A | * | 5/1948 | Hagen | 406/97 |
| 2,558,951 A | * | 7/1951 | Hagen et al. | 209/135 |
| 2,719,394 A | * | 10/1955 | Thomann et al. | 56/12.6 |
| 2,739,015 A | * | 3/1956 | Hagen | 406/168 |
| 3,316,025 A | * | 4/1967 | Sullivan et al. | 406/97 |
| 3,487,450 A | * | 12/1969 | Hubbard | 406/42 |
| 6,752,467 B1 | * | 6/2004 | Palrose et al. | 298/11 |
| 7,181,896 B2 | * | 2/2007 | Lukac et al. | 56/30 |

* cited by examiner

*Primary Examiner* — Glenn Dayoan
*Assistant Examiner* — Sunsurraye Westbrook

(57) ABSTRACT

1. My EZ DUMP lawn vacuum container has a capacity of over 48 bushels or 60 cubic feet of debris which can be backed up to a dump site, blower engine turned off, debris dumped by means of my EZ DUMP interior dump bed system, container closed and blower engine started all within under 3 minutes without leaving the seat of the lawnmower and without pulling any levers or ropes or any other manual means. Since the dump bed is a contained within the container there is no need to remove the flexible blower hose which is connected to the front of the container. The dumping of debris is accomplished with only four moving parts powered by an inexpensive 12 volt lift device. These features make my EZ DUMP lawn vacuum low maintenance and a pleasure to use, even for a 79 year old like me.

2 Claims, 2 Drawing Sheets

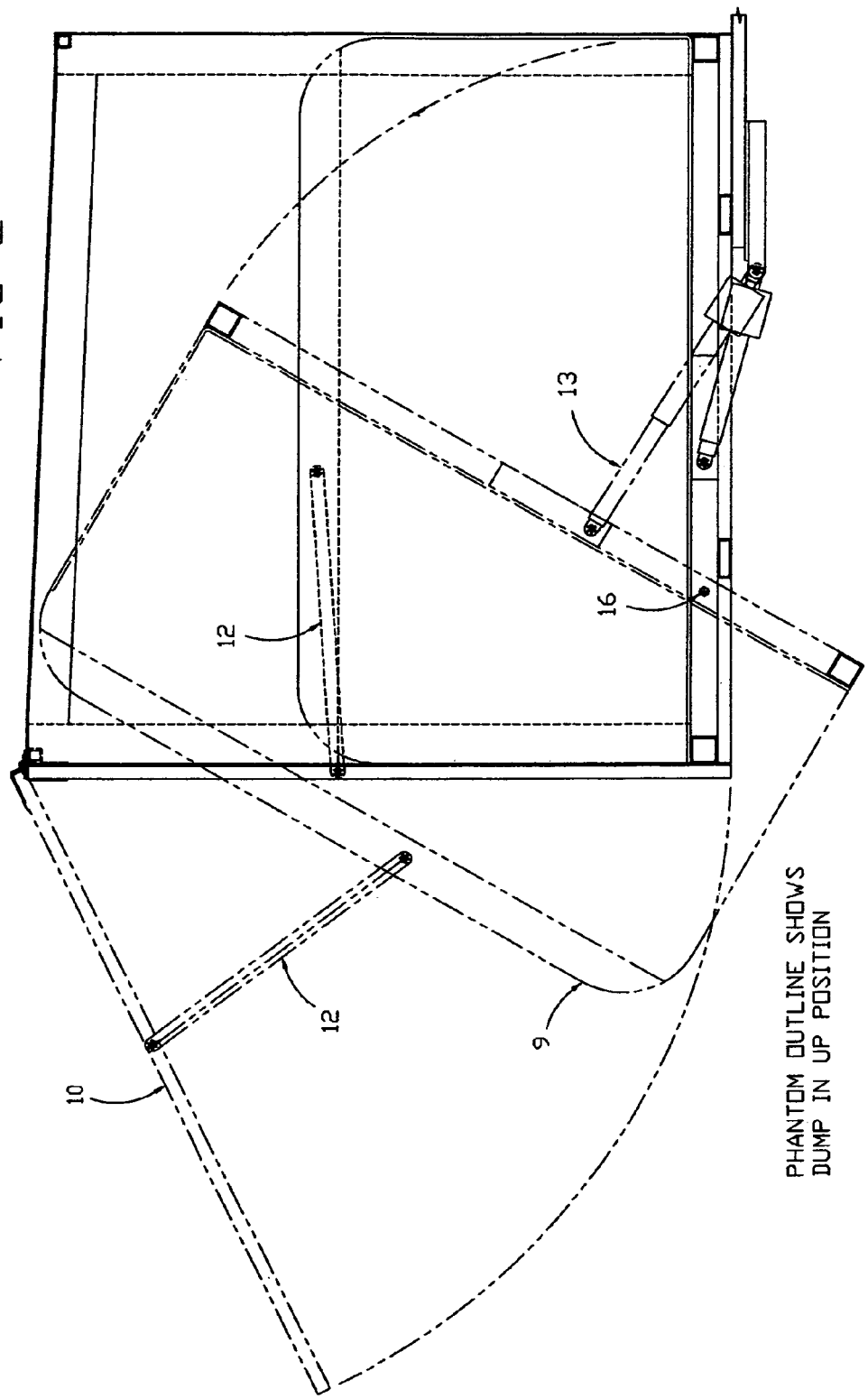

EZ DUMP LAWN VACUUM

OVERVIEW

Figure 1:
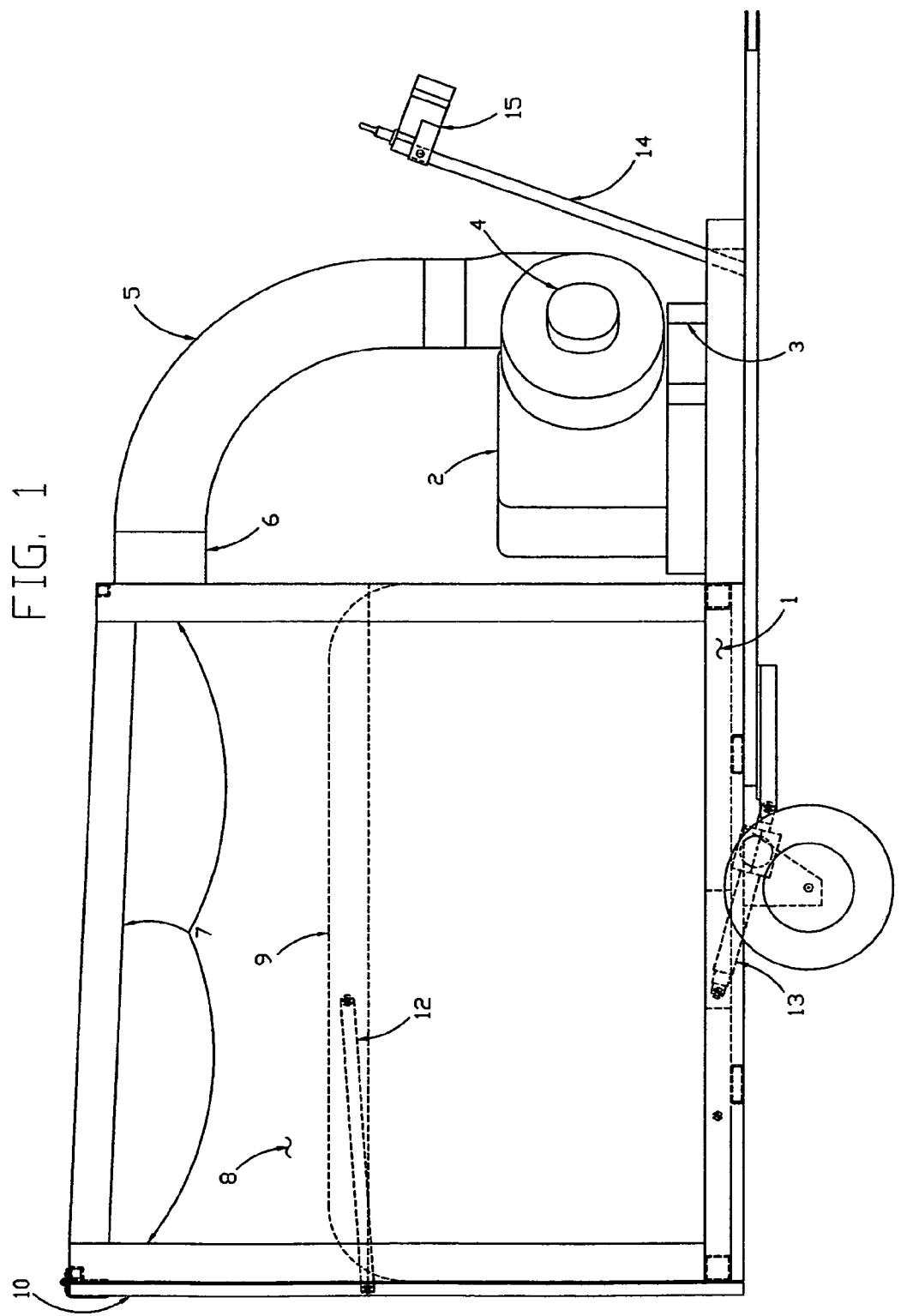

1. My invention relates to a leaf and grass (lawn debris) collector which is towed behind a riding lawn mower. A collector generally consists of trailer with a vacuum/blower which is powered by a gas engine usually mounted on the trailer in front of the container. The debris is collected by means of an adaptor and flexible hose which attaches to the mower deck then to the said vacuum/blower/engine. The debris is sucked into the vacuum/blower which then blows the debris into the container through a flexible hose attached to the top or front of the container. Since the debris blown into the container is under pressure this normally results in the debris being packed tightly into the container. When the container is filled with debris then there is the problem of removing the debris from the container.

2. This is normally done by backing the container into the place where the debris is to be dumped then turning off the blower engine and removing or lifting a tailgate at the rear of the container to allow access to the debris. The debris is then pulled out of the container with a rake or other device while standing behind the container often knee deep in previously dumped debris.

3. Some containers may tilt down at the rear after disconnecting the hose at the front but the debris normally is only partially dumped. Then the container must be closed by replacing the tailgate and then on some units reconnecting the flexible hose before starting the blower engine. The difficulty in removing the packed debris from the container normally limits the capacity of the container requiring more dumps and time consumed.

4. Since we live in a residential area with many oak trees I have been attempting for the last 7 or 8 years to invent an easier way to keep my 2 acres of leafs cleaned up. After many failed attempts I finally invented something that has worked great for the last 4 years.

SUMMARY

1. My invention by its unique design enables the operator to easily and quickly remove debris from the container by simply backing up to the dump site and flipping a switch which activates the inexpensive lift device. When closed the container appears to be a standard container on wheels that the vacuum/blower fills with lawn debris. However my invention is made up of four major parts. The trailer that supports the container, the dump bed which also supports the upper sides and front of the container, and the tailgate which opens and closes the rear of the container. When the switch activates the lift device the dump bed then begins to rise and at the same time the tailgate begins to lift. This action causes the debris to begin moving to the rear of the container and to be empty in less than one minute.

2. Flipping the switch in the down position causes the dump bed to lower and the tailgate to close tightly again in less than one minute. The lift device has limit switches for both actions freeing the operator who is still in seat of the lawn mower to move his mower forward or backward as the debris is dumping if desired. The operator then starts the vacuum/blower/engine while still seated on his lawn mower and continues vacuuming debris.

3. My unique design and ease of operation plus only 4 moving parts and low maintenance are standout features of my EZ DUMP lawn vacuum.

4. In the drawings, which form a part of this specification, FIG. 1 is a side view of the EZ Dump lawn vacuum showing the placement of the dump bed in the down position and how it forms the lower section of the container when in the down position.

FIG. 2 is a side view of the container and illustrates the action of the dump bed in the raised position and further illustrates the lifting of the tailgate by means of the lift arms which are attached to the dump bed.

DESCRIPTION

FIG. 1 Illustrates the container on trailer 1 with a vacuum/blower/gas engine 2 mounted on engine supports 3. Debris is carried from the lawn mower deck to input 4 of the vacuum/blower/gas engine 2 which blows the debris through hose 5 to input 6 on the front panel of the container. The frame of the container 7 supports front panel and upper side panels 8 and top of container which form the stationary parts of the'container. This enables hose 5 to remain connected to input 6 during all operations. Dump bed 9 is shown in the down position and thus forms the lower side panels and front panel of the container when in this position. Tailgate 10 is in held in the closed position at the back of the container by lift arms 12 which connect the tailgate 10 to the dump bed 9. Control pod 15 contains lift device 13 up/down switch which controls action of dump bed and engine 2 start/stop switch. Control pod 15 is mounted on arm 14 which places control pod 15 in easy reach of lawn mower operator.

FIG. 2 illustrates the container in the dump position shown by the phantom outline of the dump bed 9. The dump action is initiated by moving lift device 13 switch to the up position which action is completed when dump bed 9 and tailgate 10 are fully lifted. Tailgate 10 is lifted by the actions of lift arms 12 which connect the dump bed to the tailgate. Lift arms 12 also pull tailgate 10 to the closed position when dump bed 9 is in the down position. Configuration of dump bed 9 allows dump bed 9 to rise to 50 degrees from horizontal by means of pivot point 16 located 12 inches from rear of dump bed 9. Pivoting dump bed 9 at this point enables 45 percent of the load to be balanced on pivot point 16 therefore lift device 13 lifts only 55 percent of the total load. This 55 percent load decreases rapidly as dump bed 9 rises to dump position. With dump bed 9 at 50 degrees from horizontal and tailgate 10 at 70 degrees from vertical the debris dumps cleanly without any interference.

I claim:

1. A towable container for vacuumed leaf and lawn debris with a nested inner dump bed, comprising:
   a trailer frame, including wheels;
   a floor;
   a container comprising a front wall, left and right sidewalls, a top, and a rear tailgate;
   and a nested inner dump bed comprising a bottom wall, a front wall, and a left and right side wall;
   wherein said dump bed is sized and arranged to telescope into and nest inside said container with bottom wall of dump bed parallel and adjacent to the floor of the trailer in a closed position;
   said bottom wall of dump bed extending between front and rear edge;
   a pivot connection between the dump bed and frame defining a pivot axis transverse to both sides of the dump bed and container;
   wherein said pivot axis is forward of the rear edge of the dump bed and rearward of a vertical plane to the rear edge of the trailer frame;

and an actuator for selectively tilting the dump bed within the container into a dumping position.

2. The towable container of claim 1 further comprising:

at least one arm extending between one end pivotally connected to at least one sidewall of the dump bed and another end pivotally connected to the rear tailgate;

wherein said arm automatically opens and shuts the tailgate with the tilting and leveling of the dump bed, respectively.

\* \* \* \* \*